United States Patent
Burmeister et al.

(10) Patent No.: US 9,512,993 B2
(45) Date of Patent: Dec. 6, 2016

(54) EXPLOSION-PROOF LAMP

(71) Applicant: COOPER CROUSE-HINDS GMBH, Soest (DE)

(72) Inventors: Jens Burmeister, Eberbach (DE);
Bernd Schwarz, Eberbach (DE);
Gerhard Schwarz, Schonbrunn (DE);
Michael Ketterer, Soest (DE)

(73) Assignee: EATON PROTECTION SYSTEMS IP GMBH & CO. KG, Schonefeld (DE)

( * ) Notice: Subject to any disclaimer, the term of this patent is extended or adjusted under 35 U.S.C. 154(b) by 0 days.

(21) Appl. No.: 14/650,249

(22) PCT Filed: Dec. 5, 2013

(86) PCT No.: PCT/EP2013/003689
§ 371 (c)(1),
(2) Date: Jun. 5, 2015

(87) PCT Pub. No.: WO2014/086497
PCT Pub. Date: Jun. 12, 2014

(65) Prior Publication Data
US 2015/0308673 A1    Oct. 29, 2015

(30) Foreign Application Priority Data

Dec. 6, 2012   (DE) .................. 10 2012 023 989

(51) Int. Cl.
| | |
|---|---|
| *F21V 25/12* | (2006.01) |
| *F21V 21/35* | (2006.01) |
| *F21V 23/02* | (2006.01) |
| *F21V 19/00* | (2006.01) |
| *F21V 23/06* | (2006.01) |

(Continued)

(52) U.S. Cl.
CPC ............. *F21V 25/12* (2013.01); *F21V 19/002* (2013.01); *F21V 19/005* (2013.01); *F21V 21/35* (2013.01); *F21V 23/023* (2013.01); *F21V 23/06* (2013.01); *H05B 33/0803* (2013.01);

(Continued)

(58) Field of Classification Search
CPC ...... F21V 25/12; F21V 19/002; B60Q 1/0088; H01F 38/14
See application file for complete search history.

(56) References Cited

U.S. PATENT DOCUMENTS 5,264,997 A    11/1993   Hutchisson et al.

FOREIGN PATENT DOCUMENTS

| EP | 1319889 | 6/2003 |
|---|---|---|
| EP | 1253375 | 8/2006 |

(Continued)

OTHER PUBLICATIONS

Von Der Hardt, M, International Search Report of International Application No. PCT/EP2013/003689, completed Mar. 7, 2014, mailed Mar. 18, 2014, 6 pages, European Patent Office.

(Continued)

*Primary Examiner* — Karabi Guharay
(74) *Attorney, Agent, or Firm* — King & Spalding LLP

(57) ABSTRACT

An explosion-proof luminaire comprises a plurality of light-emitting diodes. These are assigned to a ballast for electrical power supply. A contactless power transmission device is formed between at least a group of LEDs and the ballast. This yields an explosion-proof luminaire which is simplified and improved in terms of structure and light output while permitting many possible arrangements of the LEDs in the corresponding luminaire at the same time.

12 Claims, 2 Drawing Sheets

(51) Int. Cl.
*H05B 33/08* (2006.01)
*H01F 38/14* (2006.01)
*F21Y 101/02* (2006.01)
*F21Y 103/00* (2016.01)

(52) U.S. Cl.
CPC ...... *H05B 33/0806* (2013.01); *F21Y 2101/02* (2013.01); *F21Y 2103/003* (2013.01); *H01F 38/14* (2013.01)

(56) References Cited

FOREIGN PATENT DOCUMENTS

| EP | 2261552 | 12/2010 |
|---|---|---|
| WO | 2004097866 | 11/2004 |
| WO | 2011057343 | 5/2011 |

OTHER PUBLICATIONS

Canadian Intellectual Property Office, Office Action issued in Canadian Patent Application No. 2,893,985, issued 9, Jun. 2016, 8 pages, Canadian Intellectual Property Office.
Machine Translation of EP 1253375, via LexsisNexsis Total Patents, 7 pages.

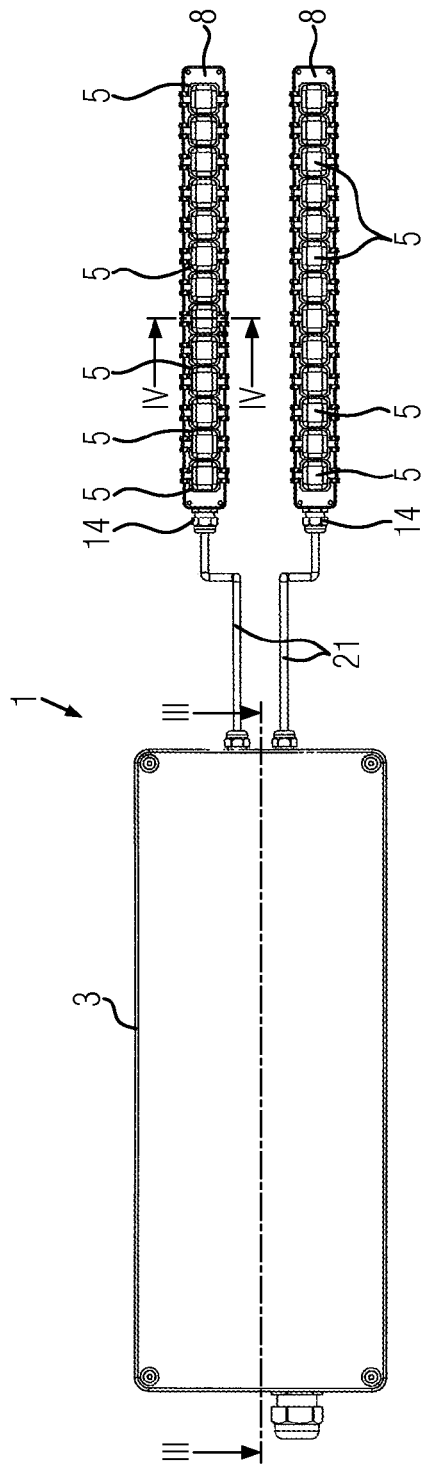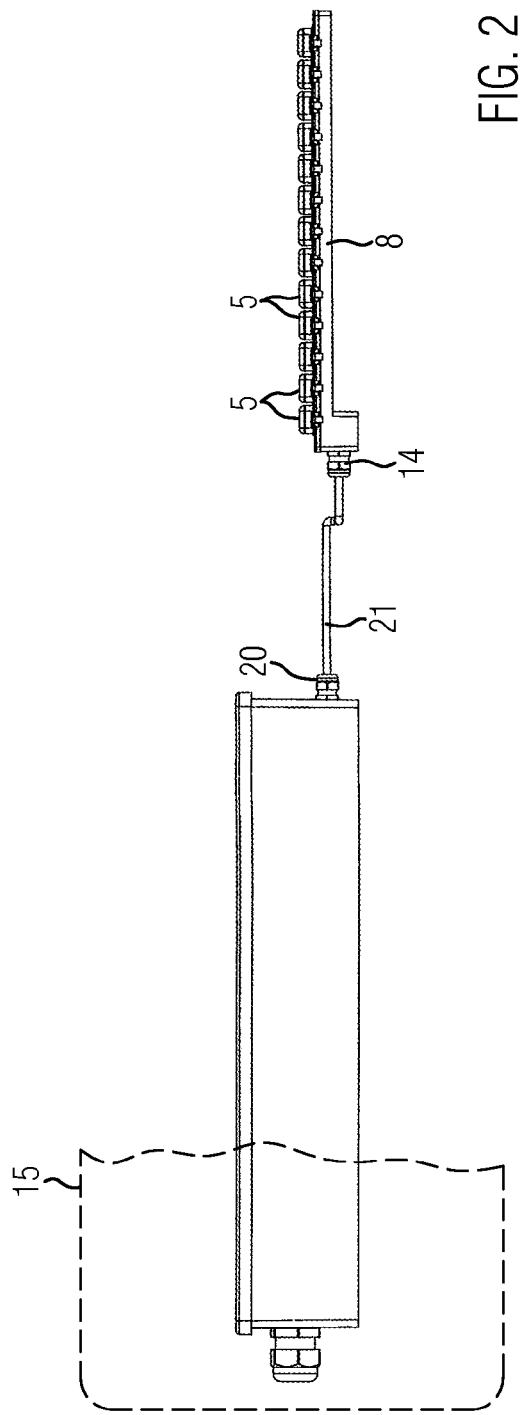

EXPLOSION-PROOF LAMP

PRIORITY CLAIM

The present application is national phase application of and claims priority to International Application No. PCT/EP2013/003689 with an International filing date of Dec. 5, 2013, which claims priority to German patent application no. 102012023989.0 filed on Dec. 6, 2012. The foregoing applications are hereby incorporated herein by reference.

TECHNICAL FIELD

The present invention relates to an explosion-proof luminaire comprising a plurality of light-emitting diodes, LEDs, which have assigned thereto a ballast for electrical power supply.

BACKGROUND

Corresponding luminaires with LEDs are already in use. As for explosion protection, the LEDs are configured as individual lamps with a corresponding protection type. For instance, it is already known that these individual lamps are configured to be of protection type Ex-i. This means that each LED is powered via a safety barrier which limits current and voltage. Due to this limitation, however, the performance of the luminaire is limited.

It is further known that corresponding individual lamps are configured to be of the ignition protection type Ex-m (encapsulation). This means that parts of a corresponding luminaire and particularly the LEDs are cast as ignition sources, so that a possible electric arc cannot traverse the corresponding encapsulation. As a result of such an encapsulation, however, the light output of each individual lamp is reduced.

It is the object of the present invention to simplify and improve an explosion-proof luminaire in its structure and light output while permitting many possible arrangements of the LEDs in the corresponding luminaire at the same time.

SUMMARY

This object is achieved together with the features of the preamble of claim 1 in that a contactless power transmission device for electrical power transmission is arranged between at least a group of LEDs and the ballast.

Owing to the contactless transmission device the corresponding LEDs can be supplied with power both individually and in groups without direct connection lines, so that even for a corresponding corporeal connection no specific protection types have to be provided. Otherwise, for example usually rather complicated and expensive flame-proof feedthroughs for the connection lines to the LEDs might be needed.

Moreover, the contactless power transmission device yields an arrangement of the individual LEDs that is quite variable, which offers a greater number of possible configurations in the design of a corresponding luminaire.

To be able to power and control each LED as such, it may be regarded as advantageous when the LED is arranged on a printed circuit board (PCB).

To be able to arrange and handle each LED in an easy way, these may be arranged in an individual housing consisting of lower part and transparent cover, wherein the individual housing may be configured to be of ignition protection type Ex-d (pressure-proof encapsulation). This individual housing is configured such that it withstands a potential explosion pressure, and possible openings of the individual housing are designed such that a transmission of the explosion to the outside is prevented. According to the invention, however, corresponding openings in the individual housing can be omitted.

The variability of the arrangement of the individual LEDs is improved in that e.g. the individual housings are configured as separate units and can be detachably mounted on an individual housing carrier. Owing to this configuration of each individual housing, an exchange is easily possible; this exchange is promoted by the detachable mounting on the individual housing carrier.

Furthermore, it may be of advantage in this context when the individual housings can be arranged in variable numbers and arrangements on the individual housing carrier. This means that in response to the respective requirements e.g. more or less individual housings may respectively be used with an LED. The individual housing carrier may be configured to be linear, for instance in order to arrange a corresponding number of individual housings along its longitudinal direction. It is also possible that the individual housing carrier is configured to be planar or provided with curvatures and corners and different orientations. In the case of such individual housing carriers, corresponding individual housings can also be used in different numbers and arrangements. It is also conceivable that more than one LED is arranged in an individual housing.

To configure each individual housing in a simple way to be of protection type Ex-d, lower part and cover of the individual housing may be produced to be glued, welded, particularly friction-welded, to one another, or as one part. The one-part production may e.g. be carried out by way of injection molding around the LED with printed circuit board.

It may also be of advantage in the case of the individual configuration of lower part and cover and also in the case of their separate configuration when a lens system, or the like, is e.g. formed in the transparent cover part. Moreover, reflection means may be contained in each individual housing.

To control each individual LED in a simple way and to vary the light output thereof, each individual housing may be powered separately.

Various options are conceivable for contactless power transmissions, such as capacitive or electromagnetic power transmission. According to the invention these power transmissions may be used, wherein, however, an inductive power transmission may be of advantage. For such an inductive power transmission a transmitter is particularly used in the individual housing carrier and a receiver in each individual housing. The transmitter produces an alternating magnetic field, with the receiver being penetrated by part of said alternating magnetic field. A voltage is thereby induced in the receiver. Since the receiver is connected via the corresponding PCB to the LED, where both PCB and LED can be regarded as a corresponding load, a current flow is produced by the load due to the induced voltage, and power is transmitted accordingly.

In the simplest case, the receiver may comprise at least one secondary coil with particularly a ferrite core, wherein the secondary coil with its core may be arranged particularly on the PCB.

For the transmitter it may be regarded as advantageous when said transmitter comprises a number of primary coils each particularly with a ferrite core.

For the arrangement of the transmitter with the number of primary coils, these may be arranged on a common transmitter carrier, particularly a transmitter board. Each of the primary coils may have assigned thereto a corresponding secondary coil in the individual housing, so that a corresponding number of LEDs can be powered, depending on the number of the primary coils. Of course, it is also possible that a smaller number of LEDs are used than existing primary coils.

The transmitter is supplied with power normally from the ballast, wherein in a preferred embodiment the individual housing carrier may comprise at least one connecting means for the electrical connection to the ballast and may be configured to be of protection type Ex-i or Ex-e.

According to the invention it is possible that a corresponding individual housing carrier with a number of individual housings arranged on said carrier is inserted into a luminaire housing. The corresponding ballast may also be arranged in this luminaire housing. Furthermore, it is possible that the individual housing carrier already forms part of the luminaire housing. For instance, a lower trough of a luminaire housing may be formed by the individual housing carrier, so that only a corresponding transparent cover must be arranged on said trough. It is also possible that two, three or more individual housing carriers are connectable not only to a ballast, but can also be arranged in a luminaire particularly also in different arrangements.

It may turn out to be advantageous for the detachable mounting of the individual housings when these are clipped onto the individual housing carrier. Such a clipping allows a simple mounting and detachment of the individual housing and might offer the possibility of displacing the individual housing along the individual housing carrier.

BRIEF DESCRIPTION OF THE DRAWINGS

An advantageous embodiment of the invention shall now be explained in more detail, attached to a drawing with figures.

FIG. 1 is a top view on an embodiment of a luminaire according to the invention;

FIG. 2 is a side view of the luminaire according to FIG. 1;

DETAILED DESCRIPTION OF THE EXAMPLE EMBODIMENTS

Figure 4:
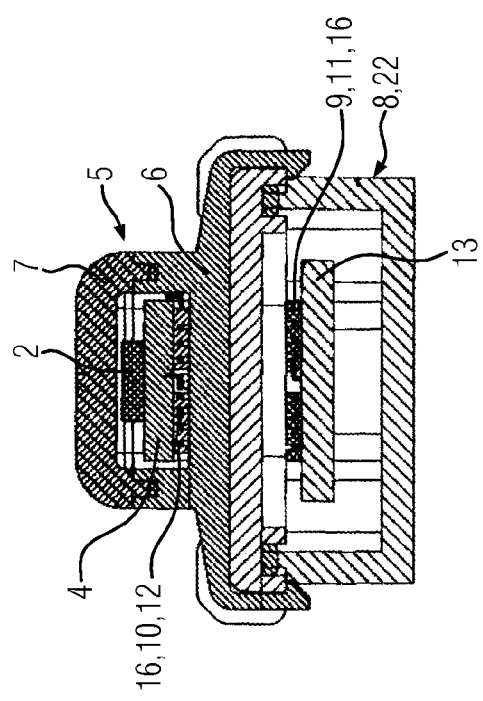
FIG. 4 is an enlarged section along line IV-IV of FIG. 1.

FIG. 1 is a top view on an embodiment of a luminaire 1 according to the invention. Said luminaire comprises a ballast 3 and two individual housing carriers 8 connected to said ballast via connection lines 21. A number of LEDs 2, see also FIG. 4, are arranged on each of the individual housing carriers 8 within associated individual housings 5. The individual housings 5 are arranged in successive order in the longitudinal direction of the individual housing carriers 8 and are detachably arranged on the individual housing carrier 8. In the illustrated embodiment the detachable arrangement is provided by way of clipping; see also FIG. 4.

The corresponding luminaire 1 according to FIG. 1 is e.g. shown without a corresponding luminaire housing 15, see FIG. 2. According to the invention it is possible that both ballast and all of the associated individual housing carriers are arranged within a corresponding luminaire housing 15.

It is also possible that the individual housing carrier(s) 8 is/are part of the luminaire housing. Such a case would e.g. only require the arrangement of a transparent cover on the individual housing carrier(s).

Each of the individual housing carriers 8 comprises a connecting means 14 for connecting the connection line 21 through which, from the ballast 3, power is supplied to the LEDs. Here, however, it should already be pointed out that it is also possible to use only one individual housing carrier, three, four or more individual housing carriers and also in an arrangement differing from the one shown in FIG. 1 for a luminaire according to the invention. Moreover, e.g. corresponding reflectors, cooling means, or the like, which can additionally be arranged in the luminaire according to the invention or assigned to said luminaire, are missing.

The luminaire 1 according to FIG. 1 is visible in FIG. 2 in a side view. Like parts are provided with like reference numerals and are only mentioned in part again.

It can particularly be seen in FIG. 2 how the various individual housings 5 are arranged in successive order in the longitudinal direction of the individual housing carrier 8 and directly adjacent to one another. In the illustrated embodiment, 13 individual housing 5 are arranged. In a side view, the individual housing carrier 8 looks like a lying L, the shorter L-leg comprising the connecting means 14 and the individual housings 5 being arranged along the longer L-leg.

Figure 3:
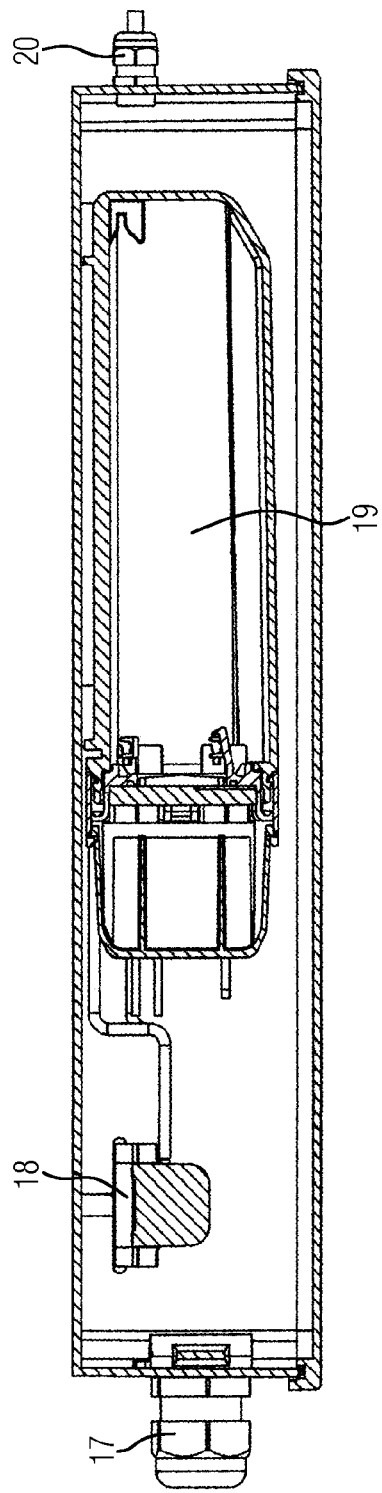
FIG. 3 is an enlarged section along line III-III of FIG. 1.

FIG. 3 shows an enlarged section along line III-III of FIG. 1. In this section, especially some parts of the ballast 3 can be seen. The ballast 3 comprises an input connection 17 at one end and an output connection 20 at the opposite end. The connection line 21 is connected via the output connection 20; see also FIGS. 1 and 2.

An input terminal 18 is arranged within the ballast 3 and a ballast driver 19 is arranged connected thereto. The ballast may be an electric or electronic ballast.

FIG. 4 is a section taken along line IV-IV of FIG. 1 through an individual housing carrier 8 with individual housings 5 arranged thereon.

Each individual housing 5 is made of two parts in the illustrated embodiment and comprises a lower part 6 and a transparent cover 7. These are glued or welded to one another at places facing each other. A corresponding weld can be produced e.g. by friction welding. It is also possible that the individual housing 5 is made as one part by injection molding around the corresponding LED with associated board or PCB 4.

The PCB 4 with LED 2 arranged thereon is visible in the interior of the individual housing 5. These are prefabricated and can be inserted into the corresponding individual housing 5. The lower part 6 of the individual housing 5 comprises clip-like extensions at both lateral ends, said extensions being guided around a part of the individual housing carrier 8 and gripping, for clipping purposes, behind parts of the individual housing carrier 8 which are protruding outwards at both sides.

As part of a contactless power transmission device 16, a secondary coil 12 is arranged as a receiver 10 on a bottom side of the board 4 which is opposite to the LED 2. The secondary coil 12 further comprises a magnetic core 11, particularly ferrite core.

A further part of the contactless power transmission device 16 is arranged within the individual housing carrier 8. The individual housing carrier 8 comprises a carrier housing 22 also consisting of lower part and upper part that are interconnected accordingly. A transmitter 9 as a further part of the contactless power transmission device 16 is arranged within the carrier housing 22. By analogy with the receiver, the transmitter comprises a primary coil as well as an associated magnetic core, particularly ferrite core. Plural primary coils with ferrite core are arranged in the case of the transmitter 9, wherein a secondary coil can be assigned to an LED, in accordance with a primary coil. The assignment is carried out by correspondingly clipping the individual housing 5 onto the individual housing carrier 8; see e.g. FIGS. 1, 2 and 4.

The various primary coils with core of the transmitter 9 are arranged inside the individual housing carrier 8 on a transmitter carrier or a transmitter board 13. This board serves to electrically power the primary coils and to control the contactless power transmission device 16 accordingly.

In accordance with the number of the primary coils 11, secondary coils 12 can be arranged, so that a number of LEDs can be powered in accordance with the number of the primary coils.

As has already been stated, the corresponding coils can also be arranged in a different way than the one shown in FIGS. 1 and 2. Circular or otherwise closed arrangements of corresponding primary coils are also possible or also concentric arrangements of plural rings of primary coils. Further arrangements or also variations in the number of primary coils and in accordance with the associated secondary coils are obvious.

The invention yields a luminaire with LEDs as individual lamps, in the case of which there is no corporeal connection needed for power transmission, and many variations are possible with respect to arrangement and number of the LEDs.

The invention claimed is:

1. An explosion-proof luminaire (1) comprising:
 a plurality of light-emitting diodes (LEDs) (2) which are assigned to a ballast (3) for electrical power supply, wherein a contactless power transmission device (16) is formed between one or more LEDs of the plurality of LEDs (2) and the ballast (3) characterized in that each of the plurality of LEDs (2) is arranged in an individual housing (5) comprising a lower part (6) and a transparent cover (7), wherein the individual housing (5) is particularly configured to be of ignition protection type Ex-d pressure-proof encapsulation and as a separate unit and detachably mounted on an individual housing carrier (8), wherein each individual housing (5) can be separately supplied with power.

2. An explosion-proof luminaire (1) according to claim 1, characterized in that each LED (2) is arranged on a printed circuit board (PCB) (4).

3. An explosion-proof luminaire (1) according to claim 1, characterized in that the individual housings (5) can be arranged to be variable in number and arrangement on the individual housing carrier (8).

4. An explosion-proof luminaire (1) according to claim 1, characterized in that the lower part (6) and the transparent cover (7) of the individual housing (5) are produced to be glued or welded to one another or as one part.

5. An explosion-proof luminaire (1) according to claim 1, characterized in that the contactless power transmission is an inductive power transmission with a transmitter (9) in or on the individual housing carrier (8) and a receiver (10) in each individual housing (5).

6. An explosion-proof luminaire (1) according to claim 5, characterized in that the receiver (10) comprises a secondary coil with a ferrite core.

7. An explosion-proof luminaire (1) according to claim 5, characterized in that the transmitter (9) comprises a number of primary coils each with a ferrite core.

8. An explosion-proof luminaire (1) according to claim 7, characterized in that the primary coils with ferrite cores of the transmitter (9) are arranged on a common transmitter carrier (13).

9. An explosion-proof luminaire (1) according to claim 1, characterized in that the individual housing carrier (8) comprises at least one connecting means (14) for the electrical connection to the ballast (3) and is configured to be of protection type Ex-i or Ex-e.

10. An explosion-proof luminaire (1) according to claim 1, characterized in that the individual housing carrier (8) is configured at least as a part of a luminaire housing (15).

11. An explosion-proof luminaire (1) according to claim 1, characterized in that two, three or more individual housing carriers (8) are connected to the ballast (3).

12. An explosion-proof luminaire (1) according to claim 1, characterized in that the individual housings (5) can be clipped onto the individual housing carrier (8).

* * * * *